US011196044B2

(12) United States Patent
Wang et al.

(10) Patent No.: US 11,196,044 B2
(45) Date of Patent: Dec. 7, 2021

(54) POSITIVE ELECTRODE PLATE AND ELECTROCHEMICAL DEVICE

(71) Applicant: Contemporary Amperex Technology Co., Limited, Fujian (CN)

(72) Inventors: Yaohui Wang, Fujian (CN); Xing Li, Fujian (CN); Zhenhua Li, Fujian (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 0 days.

(21) Appl. No.: 17/057,527

(22) PCT Filed: Nov. 15, 2019

(86) PCT No.: PCT/CN2019/118696
§ 371 (c)(1),
(2) Date: Nov. 20, 2020

(87) PCT Pub. No.: WO2020/098770
PCT Pub. Date: May 22, 2020

(65) Prior Publication Data

US 2021/0249744 A1 Aug. 12, 2021

(30) Foreign Application Priority Data

Nov. 16, 2018 (CN) ......................... 201811365898.7

(51) Int. Cl.
*H01M 4/36* (2006.01)
*H01M 50/581* (2021.01)
(Continued)

(52) U.S. Cl.
CPC ............ *H01M 4/366* (2013.01); *H01G 11/28* (2013.01); *H01G 11/32* (2013.01); *H01M 4/06* (2013.01);
(Continued)

(58) Field of Classification Search
CPC .......... H01M 4/06; H01M 4/13; H01M 4/366; H01M 4/624; H01M 6/50; H01M 10/4235;
(Continued)

(56) References Cited

U.S. PATENT DOCUMENTS

2012/0273421 A1* 11/2012 Perry .................... B01D 71/42 210/651
2013/0089781 A1* 4/2013 Miyazaki .............. H01M 4/668 429/211

FOREIGN PATENT DOCUMENTS

CN 101471435 A 7/2009
CN 102344598 A 2/2012
(Continued)

OTHER PUBLICATIONS

PCT International Search Report for PCT/CN2019/118696, dated Feb. 19, 2020, 18 pages.
(Continued)

*Primary Examiner* — Amanda C. Walke
(74) *Attorney, Agent, or Firm* — Law Offices of Liaoteng Wang

(57) ABSTRACT

The present application relates to a positive electrode plate and an electrochemical device. The positive electrode plate includes a current collector, a positive active material layer and a safety coating disposed between the current collector and the positive active material layer, the safety coating including a polymer matrix and a conductive material, wherein the polymer matrix is fluorinated polyolefin and/or chlorinated polyolefin, and when the safety coating and the positive active material layer are collectively referred to as a positive film layer, the positive film layer includes Na ions and/or K ions at a content of 100 ppm or more, and has an absorption peak at 1646 $cm^{-1}$ in infrared absorption spectrum. The positive electrode plate may improve safety
(Continued)

14
12
10 performance at elevated temperature of the electrochemical device by quickly disconnecting the circuit at high temperature conditions or when an internal short circuit occurs.

20 Claims, 4 Drawing Sheets

(51) Int. Cl.

| | |
|---|---|
| ***H01G 11/28*** | (2013.01) |
| ***H01G 11/32*** | (2013.01) |
| ***H01M 4/06*** | (2006.01) |
| ***H01M 4/13*** | (2010.01) |
| ***H01M 4/62*** | (2006.01) |
| ***H01M 6/50*** | (2006.01) |
| ***H01M 10/42*** | (2006.01) |
| *H01M 4/02* | (2006.01) |

(52) U.S. Cl.
CPC ............. *H01M 4/13* (2013.01); *H01M 4/624* (2013.01); *H01M 6/50* (2013.01); *H01M 10/4235* (2013.01); *H01M 50/581* (2021.01); *H01M 2004/021* (2013.01); *H01M 2004/028* (2013.01); *H01M 2200/106* (2013.01)

(58) Field of Classification Search
CPC ......... H01M 50/581; H01M 2004/021; H01M 2004/028; H01M 2200/106
See application file for complete search history.

(56) References Cited

FOREIGN PATENT DOCUMENTS

| | | | |
|---|---|---|---|
| CN | 104823313 | A | 8/2015 |
| CN | 105098193 | A | 11/2015 |
| CN | 105594019 | A | 5/2016 |
| CN | 106450327 | A | 2/2017 |
| CN | 106558676 | A | 4/2017 |
| CN | 107437622 | A | 12/2017 |
| CN | 107565137 | A | 1/2018 |
| JP | H1050294 | A | 2/1998 |
| JP | 2010238588 | A | 10/2010 |
| JP | 2018116810 | A | 7/2018 |

OTHER PUBLICATIONS

The firs Official Action and search report dated Sep. 7, 2020 for Chinese application No. 201811365898.7, 13 pages.

European Search Report for Application No. 19884548.9 (PCT/CN2019/118696), dated Jun. 6, 2021, 8 pages.

* cited by examiner

POSITIVE ELECTRODE PLATE AND ELECTROCHEMICAL DEVICE

CROSS-REFERENCE TO RELATED APPLICATION

This application is a National Stage of International Application No. PCT/CN2019/118696, filed on Nov. 15, 2019, which claims priority to Chinese Patent Application No. 201811365898.7 filed on Nov. 16, 2018, both of which are incorporated herein by reference in their entireties.

TECHNICAL FIELD

The present application relates to the field of electrochemical technology, and more particularly, to a positive electrode plate and an electrochemical device containing the positive electrode plate.

BACKGROUND

Lithium-ion batteries are widely used in electric vehicles and consumer electronics because of their advantages such as high energy density, high output power, long cycle life and small environmental pollution. However, lithium-ion batteries are prone to fire and explosion when subjected to abnormal conditions such as crushing, bumping or puncture, causing serious harm. Therefore, the safety problem of lithium-ion batteries greatly limits the application and popularity of lithium-ion batteries.

A large number of experimental results show that internal short circuit of lithium-ion battery is the basic cause of the battery's safety hazard. In order to avoid the internal short-circuit of the battery, researchers have tried to improve the battery in many ways, including the use of PTC materials to improve the safety performance of lithium-ion battery. A PTC (Positive Temperature Coefficient) material is a positive temperature coefficient heat sensitive material, which has the characteristic that its resistivity increases with increasing temperature. When the temperature exceeds a certain temperature, its resistivity increases rapidly stepwise.

In the study of utilizing the characteristics of PTC materials to improve the safety performance of lithium ion battery, some studies involve addition of PTC materials to the electrode active material layer of the battery. When the temperature of the battery rises, the resistance of the PTC material increases, thereby causing the resistance of the entire electrode active material layer to become large, and even making the conductive path of the entire electrode active material layer destroyed. Thus the security effect is achieved by causing power interruption and preventing the electrochemical reaction from proceeding. However, with this modification, the PTC material added in the electrode active material layer adversely affects the electrochemical performance of the battery.

Still other studies have provided a separate layer of PTC material (safety coating) between the current collector and the electrode active material layer of the battery. When the temperature of the battery rises, the resistance of the PTC material layer increases, so that the electric resistance between the current collector and the electrode active material layer is increased or even power supply is interrupted, thereby achieving the security effect of preventing the electrochemical reaction from proceeding. However, with this modification, when an active material slurry is coated on the surface of the PTC material layer, the solvent (such as NMP) in the slurry would dissolve the PTC material of the PTC layer and thus the dissolved PTC material enters the upper active material layer, which not only destroys the PCT effect of the PTC layer but also deteriorates its electrical performance. In addition, in the compacting step of the plate fabrication process, the PTC material layer is easily squeezed to the edge and thus the electrode active material layer would directly contact the current collector, so that the PTC material layer cannot improve the safety performance. In addition, it is required to greatly improve the performance of the PTC material layer, such as the response speed, the effect of blocking current.

In view of this, it is indeed necessary to provide an electrode plate and a battery having improved safety performance and battery performance, which are capable of solving the above problems.

SUMMARY

An object of the present application is to provide an electrode plate and an electrochemical device with improved safety and electrical performance.

A further object of the present application is to provide an electrode plate and an electrochemical device with good safety performance, especially safety performance during nail penetration, and improved electrical performance, especially cycle performance.

The present application provides a positive electrode plate including a current collector, a positive active material layer and a safety coating disposed between the current collector and the positive active material layer, wherein the safety coating includes a polymer matrix and a conductive material, and the polymer matrix is fluorinated polyolefin and/or chlorinated polyolefin and when the safety coating and the positive active material layer are collectively referred to as a positive film layer, the positive film layer includes Na ions and/or K ions at a content of 100 ppm or more, and has an absorption peak at 1646 $cm^{-1}$ in its infrared absorption spectrum.

The present application also provides an electrochemical device including the positive electrode plate of the present application, wherein the electrochemical device is preferably a capacitor, a primary battery or a secondary battery.

DESCRIPTION OF THE DRAWINGS

The positive electrode plate, the electrochemical device and the beneficial effects of the present application will be described in detail below with reference to the accompanying drawings and specific embodiments.

Figure 1:
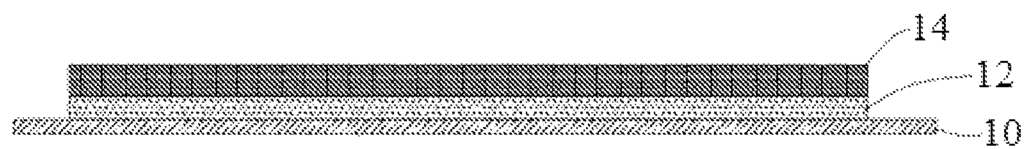
FIG. 1 is a schematic structural view of a positive electrode plate according to an embodiment of the present application, in which 10—a current collector; 14—a positive active material layer; 12—a safety coating (i.e., PTC safety coating).

In the drawings, the reference numerals are defined as follows:

1—battery pack;

2—upper cabinet body;

3—lower cabinet body;

4—battery module;

5—battery;

51—case;

52—electrode assembly and

53—top cover assembly.

DETAILED DESCRIPTION

The present application discloses a positive electrode plate comprising a current collector, a positive active material layer and a safety coating disposed between the current collector and the positive active material layer, wherein the safety coating comprises a polymer matrix and a conductive material.

FIG. 1 is a schematic structural view of a positive electrode plate according to some embodiments of the present application, in which 10—a current collector; 14—a positive active material layer; 12—a safety coating (i.e., PTC safety coating).

It would be easy to understand that although the PTC safety coating 12 and the positive active material layer 14 are provided only on one side of the positive current collector 10 as shown in FIG. 1, in other embodiments, the PTC safety coating 12 and the positive active material layer 14 may be provided on both sides of the positive current collector 10.

After the safety coating 12 and the positive active material layer 14 are respectively formed on the current collector 10, the two are bonded together and cannot be easily distinguished from each other in appearance. Peeling them from the current collector generally results in a coating as a whole. Therefore, the safety coating and the positive active material layer are generally collectively referred to as a positive film layer (or simply a film layer).

The conventional PTC safety coating comprises a polymer matrix material, a conductive material and an optional binder, which works as below. At normal temperature, the safety coating relies on a good conductive network formed between the conductive materials to conduct electron conduction. When the temperature rises, the volume of the polymer matrix materials begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero, thereby protecting the electrochemical device with the safety coating.

In traditional PTC coatings used in batteries, polyethylene, polypropylene, or ethylene-propylene copolymers are usually used as a PTC matrix material. In this case, an additional binder is required to be added to the PTC matrix material and the conductive material. If the content of the binder is too small, the adhesion between the coating and metal current collector is poor. If the content of the binder is too large, the PTC effect such as response temperature and response speed will be affected. In order to overcome defects of prior PTC safety coatings, the present application adopts a variety of technical means to work together to improve performance and stability of PTC safety coatings.

Firstly, the inventors have found that stability and performance of the safety coatings can be improved by selecting a polymer matrix material in the safety coatings.

In a conventional coating having PTC effect for use in batteries, fluorinated polyolefin or chlorinated polyolefin (such as PVDF) is used as a binder. When used as a binder, the amount of PVDF is much less than the amount of the matrix material. For example, PVDF binder in a conventional PTC coatings is typically present in an amount of less than 15% or 10%, or even less, relative to the total weight of the coating. Some publications such as CN105594019A, CN106558676A also mention that PVDF itself may be used as a PTC matrix material, but most of them are purely speculative and have not actually verified the effects achieved by using PVDF as a PTC matrix material. Meanwhile, some other publications such as paragraph [0071] in CN104823313A explicitly recite that PVDF is not suitable for use as a PTC matrix material.

However, the inventors have found that fluorinated polyolefin and/or chlorinated polyolefin can function as a polymer matrix material for a PTC thermistor layer. Based on to the total weight of safety coating, the weight percentage of the fluorinated polyolefin and/or chlorinated polyolefin as the polymer matrix material is usually 35 wt % to 75 wt %, which is much higher than that of fluorinated polyolefin or chlorinated polyolefin such as PVDF usually used as a binder in the prior PTC thermistor layer.

In the present application, the fluorinated polyolefin and/or chlorinated polyolefin material actually functions, both as a PTC matrix and as a binder, which avoids the influence on the adhesion of the coating, the response speed, and the response temperature of the PTC effect due to the difference between the binder and the PTC matrix material.

Secondly, the safety coating composed of fluorinated polyolefin and/or chlorinated polyolefin and a conductive material can function as a PTC thermistor layer and its operating temperature range is suitably from 80° C. to 160° C. Thus the high temperature safety performance of the battery may be improved well.

Furthermore, fluorinated polyolefin and/or chlorinated polyolefin as the polymer matrix material of the safety coating serves as both a PTC matrix and a binder, thereby facilitating the preparation of a thinner safety coating without affecting the adhesion of the safety coating.

In addition, the solvent such as NMP or the electrolyte in the positive active material layer over the safety coating may have an adverse effect such as dissolution and swelling on the polymer material of the safety coating. For the safety coating containing PVDF in a binder amount, the adhesion would be easy to be worse. In the safety coating of the present application, the above adverse effect may be relatively low since the content of fluorinated polyolefin and/or chlorinated polyolefin is relatively high.

Secondly, the inventors have found that stability and performance of the safety coatings can be further improved by subjecting the polymer matrix material in the safety coating to a crosslinking treatment.

Due to the fact that the solvent such as NMP in the positive active material layer or the electrolyte over the safety coating may adversely dissolve and swell the polymer material in the safety coating, it is easy to produce the following technical problems.

(1) Because the polymer matrix such as fluorinated polyolefin and/or chlorinated polyolefin in the safety coating is swelled largely by organic solvents such as NMP and the electrolyte, the positive active material layer coated over the safety coating will be easy to crack due to uneven stress in the case that the application speed is too fast.

(2) Because the polymer matrix such as fluorinated polyolefin and/or chlorinated polyolefin in the safety coating is swelled largely by organic solvents such as NMP and the electrolyte, the introduction of the safety coating will cause a larger increase of DCR (DC internal resistance) of the battery, which is not conducive to improving the battery's kinetic performance.

The inventors of the present invention have surprisingly found that cross-linking treatment can reduce the swelling and dissolution of the polymer matrix, increase the binding force between the safety coating and the current collector, and reduce cracking and battery DCR growth.

For the fluorinated polyolefin and/or chlorinated polyolefin polymer matrix, the crosslinking treatment can be achieved by introducing an activator and a crosslinking agent. The role of the activator is to remove HF or HCl from fluorinated polyolefin and/or chlorinated polyolefin to form a C═C double bond and the role of the crosslinking agent is to crosslink the C═C double bond.

It has been found experimentally that it is preferred to use an activator containing Na or K, such as sodium or potassium silicate. Sodium silicate or potassium silicate is a strong base and weak acid salt, which is weakly alkaline after hydrolysis, which salt partially removes HF or HCl from fluorinated polyolefins and/or chlorinated polyolefins to form a C═C double bonds, and which is not easy to form a gel. If a strong base is used, more C═C double bonds are generated, which can easily cause slurry gelation. The weight ratio of the activator to the polymer matrix is usually in the range of 0.5% to 5%.

For the crosslinking agent, there is no special limitation. The crosslinking agent may be selected from at least one of polyisocyanates (JQ-1, JQ-1E, JQ-2E, JQ-3E, JQ-4, JQ-5, JQ-6, PAPI, emulsifiable MDI, tetraisocyanate), polyamines (propylenediamine, MOCA), polyols (polyethylene glycol, polypropylene glycol, trimethylolpropane), glycidyl ethers (polypropylene glycol glycidyl ether), inorganic substances (zinc oxide, aluminum chloride, aluminum sulfate, sulfur, boric acid, borax, chromium nitrate), glyoxal, aziridine, organosilicons (ethylorthosilicate, methyl orthosilicate, trimethoxysilane), benzenesulfonic acids (p-toluenesulfonic acid, p-toluenesulfonyl chloride), ethylenically unsaturated compounds (styrene, α-methylstyrene, acrylonitrile, acrylic acid, methacrylic acid, acrylates (1,4-butylene glycol diacrylate, ethylene glycol dimethacrylate, triallyl cyanurate (TAC), butyl acrylate, 2-hydroxyethyl acrylate (HEA), hydroxypropyl acrylate (HPA), 2-hydroxyethyl methacrylate (HEMA), 2-hydroxypropyl methacrylate (HPMA), methyl methacrylate (MMA))), organic peroxides (dicumyl peroxide, bis(2,4-dichlorobenzoyl) peroxide), and metal organic compounds (aluminum isopropoxide, zinc acetate, titanium acetylacetonate). The weight ratio of the crosslinking agent to the polymer matrix is from 0.01% to 5%. If the content of crosslinking agent is too small, the crosslinking degree of the polymer matrix is low, which cannot eliminate cracking completely. If the content of crosslinking agent is too high, it is easy to cause gel during stirring. Furthermore, since the fluorinated polyolefin and/or chlorinated polyolefin material actually functions both as a PTC matrix and as a binder, if the content of cross-linking agent is too high, it will affect the amount of the polymer matrix used as the PTC matrix, thereby causing the PTC effect to deteriorate.

The activator and the crosslinking agent may be added simultaneously or sequentially after the stirring step of the slurry for preparing the safety coating is completed, and then the resulting mixture may be uniformly stirred and then be coated. Preferably, a crosslinking reaction occurs during the stirring procedure.

Figure 2:
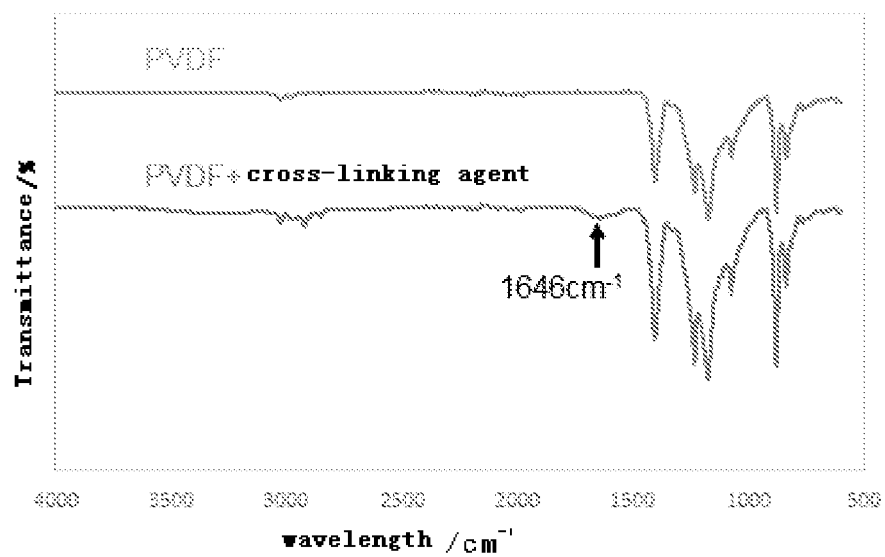
FIG. 2 is an infrared absorption spectrum of the positive film layer of the positive electrode plate according to an embodiment of the present application in which the upper one is a spectrum of a comparative coating obtained without the addition of an activator and a crosslinking agent, and the underlying one is a spectrum of an example coating with the addition of an activator and a crosslinking agent.

Due to use of Na or K-containing activators, Na or K ions will remain in the safety coating after drying and curing (in an amount of more than about 100 ppm relative to the content of the film layer). In addition, due to use of Na or K-containing activators, C═C double bonds are formed in the polymer matrix material. However, it is impossible for all C═C double bonds to crosslink i.e., to polymerize, so there will be C═C double bond remains. The residual C═C double bond can be determined by the presence or absence of an absorption peak at 1646 cm-1 in an infrared spectrum (see FIG. 2).

Therefore, whether the fluorinated polyolefin and/or chlorinated polyolefin polymer matrix is or not crosslinked with Na or K-containing activators can be determined by detecting whether there are more than 100 ppm of Na or K ions remaining in the film layer and whether there is an absorption peak at 1646 cm-1 in the infrared spectrum. If a mixture of sodium silicate and potassium silicate is used in the cross-linking process, Na ions and K ions will remain at the same time in the film layer. In this case, ≥100 ppm refers to the sum of the concentration of Na ions and K ions.

In summary, by using a crosslinked fluorinated polyolefin and/or chlorinated polyolefin polymer matrix material in the PTC safety coating, the performance and stability of the PTC safety coating can be improved, especially cracking and battery DCR growth can be improved.

Accordingly, the positive electrode plate of the present application comprises a current collector, a positive active material layer and a safety coating disposed between the current collector and the positive active material layer, wherein the safety coating comprises a polymer matrix and a conductive material and the polymer matrix is fluorinated polyolefin and/or chlorinated polyolefin and the positive film layer comprises Na ions and/or K ions at a content of 100 ppm or more, and has an absorption peak at 1646 $cm^{-1}$ in its infrared absorption spectrum.

In addition, as a preferred embodiment of the present application, addition of an inorganic filler to the safety coating can further stabilize the safety coating.

It has been found that in the case that the safety coating does not contain an inorganic filler, the solvent such as NMP in the positive active material layer or the electrolyte over the safety coating would probably cause a negative effect on the polymer material in the safety coating, such as dissolution and swelling, thereby damaging the safety coating and affecting its PTC effect. After adding an inorganic filler to the safety coating, the inorganic filler functions as a barrier, thereby advantageously eliminating the above-mentioned adverse effects such as dissolution and swelling, and thus advantageously stabilizing the safety coating. In addition, it has also been found that the addition of the inorganic filler is also advantageous for ensuring that the safety coating is not easily deformed during compaction of the electrode plate. Therefore, the addition of the inorganic filler can well ensure that the safety coating is stably disposed between the metal current collector and the positive active material layer and that the metal current collector is prevented from directly contacting the positive active material layer, thereby improving safety performance of the battery.

The inventors have also unexpectedly discovered that inorganic fillers can also improve the performance such as the response speed of the safety coating. The safety coating works as below. At normal temperature, the safety coating relies on a good conductive network formed between the conductive materials to conduct electron conduction. When the temperature rises, the volume of the polymer matrix materials begins to expand, the spacing between the particles of the conductive materials increases, and thus the conductive network is partially blocked, so that the resistance of the safety coating increases gradually. When a certain temperature for example the operating temperature is reached, the conductive network is almost completely blocked, and the current approaches zero. However, usually the conductive network is partially recovered, when the inside of the safety coating reaches a dynamic balance. Therefore, after reaching a certain temperature for example, the operating temperature, the resistance of the safety coating is not as large as expected, and still there is very small current flowing through. The inventors have found that after the inorganic filler is added and the volume of the polymer matrix materials expands, the inorganic filler and the expanded polymer matrix material can function to block the conductive network. Therefore, after the addition of the inorganic filler, the safety coating can better produce PTC effect in the operating temperature range. That is to say, the increasing speed of resistance is faster and the PTC response speed is faster at a high temperature. Thus, the safety performance of battery can be improved better.

Therefore, in a preferred embodiment of the present application, the positive electrode plate comprises a current collector, a positive active material layer and a safety coating disposed between the current collector and the positive active material layer, wherein the safety coating comprises a polymer matrix, a conductive material and an inorganic filler and the polymer matrix is fluorinated polyolefin and/or chlorinated polyolefin, and the positive film layer comprises Na ions and/or K ions at a content of 100 ppm or more and has an absorption peak at 1646 $cm^{-1}$ in infrared absorption spectrum.

The above briefly introduces the working principle of the positive electrode plate of the present application. The positive electrode plate and its constituent parts of the present application, including a safety coating (comprising a polymer matrix material, a conductive material, an optional inorganic filler, and other optional additives used to form the safety coating), a positive current collector, a positive active material layer, etc. will be specifically introduced below.

Conductive Material

Relative to the total weight of a polymer matrix, a conductive material and an optional inorganic filler, the conductive material is present in a weight percentage of 5 wt % to 25 wt %, preferably of 5 wt % to 20 wt %. In addition, preferably, the weight ratio of the polymer matrix to the conductive material is 2 or more.

The conductive material may be selected from at least one of a conductive carbon-based material, a conductive metal material, and a conductive polymer material. As an example, the conductive carbon-based material may be selected from at least one of conductive carbon black, acetylene black, graphite, graphene, carbon nanotubes, carbon nanofibers; the conductive metal material may be selected from at least one of Al powder, Ni powder, and gold powder; and the conductive polymer material may be selected from at least one of conductive polythiophene, conductive polypyrrole, and conductive polyaniline. The conductive materials may be used alone or in combination of two or more.

Conductive materials are typically used in the form of powders or granules. The particle size may be 5 nm to 500 nm, for example, 10 nm to 300 nm, 15 nm to 200 nm, 15 nm to 100 nm, 20 nm to 400 nm, or 20 nm to 150 nm, depending on the specific application environment.

In the present application, relative to the total weight of safety coating, the conductive material is present in a weight percentage of 5 wt % to 25 wt %, preferably of 5 wt % to 20 wt %. Preferably, the weight ratio of the polymer matrix to the conductive material is 2 or more. With the above ratio, the safety performance during nail penetration can be further improved. If the weight ratio of the polymer matrix material to the conductive material is less than 2, the content of the conductive material is relatively high, and the conductive network may not be sufficiently broken at elevated temperature, thereby affecting the PTC effect. If the weight ratio of the polymer matrix material to the conductive material is too high, the content of the conductive material is relatively low, which causes a large increase in the DCR of the battery at normal operation. Preferably, the weight ratio of the polymer matrix to the conductive material is 2 or more and 8 or less.

Polymer Matrix Material

The present positive electrode plate comprises a polymer matrix, and the polymer matrix is fluorinated polyolefin and/or chlorinated polyolefin. Relative to the total weight of a polymer matrix, a conductive material and optional inorganic filler, the weight percentage of the polymer matrix material is usually from 35 wt % to 75 wt %, preferably from 40 wt % to 75 wt %, more preferably from 50 wt % to 75 wt %.

In the present application, fluorinated polyolefin and/or chlorinated polyolefin as the polymer matrix of the safety coating refers to polyvinylidene fluoride (PVDF), polyvinylidene chloride (PVDC), modified PVDF, and/or modified PVDC. For example, said fluorinated polyolefin and/or chlorinated polyolefin may be selected from PVDF, carboxylic acid modified PVDF, acrylic acid modified PVDF, PVDF copolymers, PVDC, carboxylic acid modified PVDC, acrylic acid modified PVDC, PVDC copolymers or any mixture thereof.

Inorganic Filler

Relative to the total weight of a polymer matrix, a conductive material and an inorganic filler, the inorganic filler is present in a weight percentage of 10 wt % to 60 wt %. If the content of the inorganic filler is too small, it will not be enough to stabilize the safety coating; if the content is too large, it will affect the PTC performance of the safety coating. The weight percentage of the inorganic filler is preferably from 15 wt % to 45 wt %.

The inorganic filler may be selected from at least one of metal oxides, non-metal oxides, metal carbides, non-metal carbides, and inorganic salts, all optionally modified with at least one of a conductive carbon coating, a conductive metal coating or a conductive polymer coating.

For example, the inorganic filler may be selected from at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium manganese oxide, lithium nickel oxide, lithium nickel manganese oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, and lithium titanate, all optionally modified with at least one of a conductive carbon coating, a conductive metal coating or a conductive polymer coating.

Especially, the inventors have found that it is particularly advantageous when a positive electrochemically active material optionally modified with a conductive carbon coating, a conductive metal coating or a conductive polymer coating is used as an inorganic filler in the case that the safety coating is used for a positive electrode plate. In such a case, in addition to above mentioned functions as stabilizing the safety coating (hindering organic solvent from dissolving or swelling the polymer material and ensuring that the binding layer is not easily deformed) and as improving the performance such as the response speed of the safety coating, the inorganic filler may further play the following two roles:

(1) To improve the overcharge performance of the battery. In the PTC safety coating system composed of a fluorinated polyolefin and/or chlorinated polyolefin polymer matrix and a conductive material, since the electrochemically active material has the characteristics of lithium ion intercalation and de-intercalation, the electrochemically active material can be used as "active sites" in the conductive network at the normal operating temperature of the battery and thus the number of "active sites" in the safety coating is increased. In the process of overcharging, the electrochemically active material will delithiate, the de-lithiating process has become more and more difficult, and the impedance is increasing. Therefore, when the current passes, the heat-generating power increases, and the temperature of the primer layer increases faster, so the PTC effect responds faster, which in turn can generate PTC effects before the overcharge safety problem of battery occurs. Thus the battery overcharge safety performance may be improved.

(2) To contribute to charge and discharge capacity. Since the electrochemically active material can contribute to a certain charge and discharge capacity at the normal operating temperature of the battery, the effect of the safety coating on the electrochemical performance such as capacity of the battery at the normal operating temperature can be dropped to the lowest.

Therefore, for the positive electrode plate, it is the most preferred to use a positive electrochemically active material optionally modified with a conductive carbon coating, a conductive metal coating or a conductive polymer coating as the inorganic filler of the safety coating. The positive electrochemically active material is preferably selected from at least one of lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganese oxide, spinel lithium nickel manganese oxide, and lithium titanate, all optionally modified with a conductive carbon coating, a conductive metal coating, and a conductive polymer coating. Especially, the positive electrochemically active material is at least one of the above electrochemically active materials modified with a conductive carbon coating, such as conductive carbon coating modified lithium cobalt oxide, conductive carbon coating modified lithium nickel manganese cobalt oxide, conductive carbon coating modified lithium nickel manganese aluminum oxide, conductive carbon coating modified lithium iron phosphate, conductive carbon coating modified lithium vanadium phosphate, conductive carbon coating modified lithium cobalt phosphate, conductive carbon coating modified lithium manganese phosphate, conductive carbon coating modified lithium manganese iron phosphate, conductive carbon coating modified lithium iron silicate, conductive carbon coating modified lithium vanadium silicate, conductive carbon coating modified lithium cobalt silicate, conductive carbon coating modified lithium manganese silicate, conductive carbon coating modified spinel lithium manganese oxide, conductive carbon coating modified spinel lithium nickel manganese oxide, conductive carbon coating modified lithium titanate. These electrochemically active materials and conductive carbon coating modified electrochemically active materials are commonly used materials in the manufacture of lithium batteries, most of which are commercially available. The type of conductive carbon may be graphite, graphene, conductive carbon black, carbon nanotubes or the like. Further, the conductivity of the inorganic filler can be adjusted by adjusting the content of the conductive carbon coating.

When the particle size of the inorganic filler is too small, it will have increased specific surface area and thus side reaction will increase, when the particle size of the inorganic filler is too large, the application thickness of the safety coating is too large and the coating is not easy to be even. Preferably, the average particle size D of the inorganic filler in the safety coating satisfies the relationship of 100 nm≤D≤10 μm, more preferably 1 μm≤D≤6 μm. When the particle size of the inorganic filler is in the above ranges, it may also improve the effect of blocking the conductive network at a high temperature, thereby improving the response speed of the safety coating. Further preferably, the inorganic filler in the safety coating has a specific surface area (BET) of not more than 500 $m^2/g$. When the specific surface area of the inorganic filler increases, side reaction will increase and thus the battery performance will be affected. Moreover, in the case that the specific surface area of the inorganic filler is too large, a higher proportion of binder will be required to be consumed, which will cause the binding force among the safety coating, the current collector and the positive active material layer to be reduced and the growth rate of the internal resistance to be high. When the specific surface area (BET) of the inorganic filler is not more than 500 $m^2/g$, a better overall effect can be provided.

Safety Coating

In addition to being used as a matrix material, fluorinated polyolefin and/or chlorinated polyolefin used in the safety coating of the present positive electrode plate itself has a good adhesion, and thus may be used as a binder. Therefore, the safety coating does not need any additional binder, which may simplify the process and save the cost. Thus, in a preferred embodiment of the present application, the safety coating layer is substantially free of other binders than the polymer matrix material in which the phrase "substantially free" means≤3%, ≤1%, or ≤0.5%.

Moreover, in some preferred embodiments of the present application, the safety coating may consist substantially of the polymer matrix, the conductive material, and the inorganic filler, which is free of a significant amount (e.g., ≤3%, ≤1%, or ≤0.5%) of other components.

In some other embodiments of the present application, in addition to the above-mentioned polymer matrix, conductive material, and optional inorganic filler, the safety coating in the positive electrode plate of the present application may further comprise other auxiliary agents, for example, a second polymer matrix material different from the polymer matrix, and other components such as a binder.

The safety coating in the positive electrode plate of the present application can be formed by a conventional method. For example, the required safety coating may be formed by dissolving a polymer matrix material, a conductive material, an inorganic filler, and an optional binder or other auxiliary agents in a solvent and stirring the resulting mixture to form a slurry, and then coating the slurry on a current collector, followed by heating and drying.

In the positive electrode plate of the present application, the safety coating is directly adhered to the current collector and is disposed between the current collector and the positive active material layer. The thickness H of the safety coating may be reasonably determined according to actual demand. The thickness H of the safety coating is usually not more than 40 μm, preferably not more than 25 μm, more preferably not more than 20 μm, 15 μm or 10 μm. The coating thickness of the safety coating is usually greater than or equal to 1 μm, preferably greater than or equal to 2 μm, and more preferably greater than or equal to 3 μm. If the thickness is too small, it is not enough to ensure that the safety coating improves the safety performance of the battery; if it is too large, the internal resistance of the battery will increase seriously, which will affect the electrochemical performance of the battery during normal operation. Preferably, it satisfies $1\ \mu m \leq H \leq 20\ \mu m$, more preferably $3\ \mu m \leq H \leq 10\ \mu m$.

The safety coating and the current collector has a binding force of preferably 10 N/m or more. Larger binding force can prevent the film layer from cracking and improve the safety performance during nailing penetration. For example, the binding force between the safety coating and the current collector can be increased by introducing an additional binder or by carrying out crosslinking treatment to the polymer matrix to increase the binding force between the safety coating and the current collector.

Current Collector

For the current collector, the common materials in the art, preferably metal current collectors, such as metal flakes or metal foils of stainless steel, aluminum, copper, titanium can be used. Preferably the current collector is a porous current collector, for example, a porous aluminum foil. Use of the porous aluminum foil can reduce the probability of occurrence of the metal burrs and further reduce the probability of occurrence of a severe aluminothermic reaction in an abnormal situation such as nailing. Therefore, safety performance of the electrochemical device may be further improved. In addition, use of porous aluminum foil can also improve infiltration of the electrolyte to the electrode plate, and thereby improve the kinetic performance of the lithium ion battery. The safety coating can cover the surface of the porous aluminum foil to prevent leakage of the active material layer during the coating process. The metal current collectors preferably have a thickness of 4 μm~16 μm.

In addition, in consideration of the safety performance during nail penetration, the elongation at break δ of the current collector preferably is in the range of 0.8% to 4%. It was found that if the elongation at break of the current collector is too large, the metal burrs will be larger during nail penetration, which is not conducive to improving safety performance of the battery; if the elongation at break of the current collector is too small, breakage is likely to occur during processing such as plate compaction or when the battery is squeezed or collided, thereby degrading quality or safety performance of the battery. Therefore, in order to further improve safety performance, particularly safety performance during nail penetration, the elongation at break δ of the current collector should be not more than 4% and not less than 0.8%. The elongation at break of the metal current collector can be adjusted by changing purity, impurity content and additives of the metal current collector, the billet production process, the rolling speed, the heat treatment process, and the like.

Positive Active Material Layer

The positive active material layer used in the present positive electrode plate may be selected from various conventional positive active material layers in the art, and the components and preparation thereof are well known in the art without any particular limitation. The positive active material layer contains a positive active material, and various positive active materials for preparing a lithium ion secondary battery positive electrode known to those skilled in the art may be used. For example, the positive active material is a lithium-containing composite metal oxide, for example one or more of $LiCoO_2$, $LiNiO_2$, $LiMn_2O_4$, $LiFePO_4$, and lithium nickel cobalt manganese oxides (such as $LiNi_{0.5}Co_{0.2}Mn_{0.3}O_2$) and one or more of lithium nickel manganese oxides.

When a positive electrochemically active material (or a coating modified material thereof) is used as the inorganic filler for the safety coating of the positive electrode plate, the positive electrochemically active material in the safety coating and the positive active materials may be the same or different.

The inventors have found that the elongation of the film layer of the present application will greatly improve the safety performance of the battery during nail penetration.

As a further improvement of the present application, the film layer has an elongation of 30% or more, preferably 80% or more. The advantage of the larger elongation is that in the abnormal situation such as nail penetration, the film layer with larger elongation can wrap metal burrs that may be generated in the current collector to prevent the occurrence of short circuit in the battery, thereby greatly improving the safety performance of the battery during nail penetration. For a conventional positive active material layer, its elongation is generally not more than 1%, and it cannot function to wrap metal burrs. In the present application, the elongation of the film layer is greatly improved due to the introduction of the safety coating.

If the content of the polymer matrix in the safety coating is increased, it is inevitably beneficial to the elongation of the film layer. However, if the content of the polymer matrix in the safety coating is too large, the content of the conductive material will be relatively low, thereby causing a large increase in DCR of the battery during normal operation. Therefore, it is preferred that the film layer has an elongation of 80% or more and 300% or less.

Preferably, the film layer has a thickness on single side of from 30 μm to 80 μm.

The negative electrode plate for use in conjunction with the positive electrode plate of the present application may be selected from various conventional negative electrode plates in the art, and the components and preparation thereof are well known in the art. For example, the negative electrode plate may comprises a negative electrode current collector and a negative active material layer disposed on the negative electrode current collector, and the negative active material layer may comprise a negative active material, a binder, a conductive material, and the like. The negative active material is, for example, a carbonaceous material such as graphite (artificial graphite or natural graphite), conductive carbon black, or carbon fiber, a metal or a semimetal material such as Si, Sn, Ge, Bi, Sn, In, or an alloy thereof, and a lithium-containing nitride or a lithium-containing oxide, a lithium metal or a lithium aluminum alloy.

The present application also discloses an electrochemical device, comprising the positive electrode plate according to the present application. The electrochemical device may be a capacitor, a primary battery or a secondary battery, for example a lithium-ion capacitor, a lithium-ion battery or a sodium-ion battery. Except for the use of the positive electrode plate as described above, the construction and preparation methods of these electrochemical devices are known per se. Due to the use of the positive electrode plate as described above, the electrochemical device can have improved safety performance especially during nail penetration and electrical performance. Furthermore, the positive electrode plate according to this application can be easily processed, so that the manufacturing cost of the electrochemical device can be reduced by using the positive electrode plate according to the present application.

Figure 3:
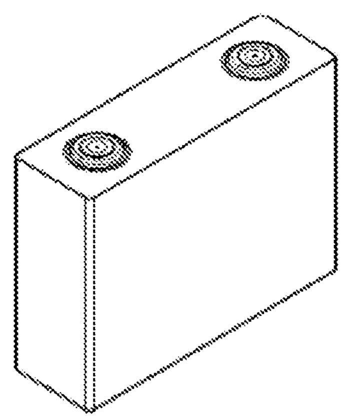
FIG. 3 is a perspective view of a lithium ion battery according to an embodiment of the present application.
Figure 4:
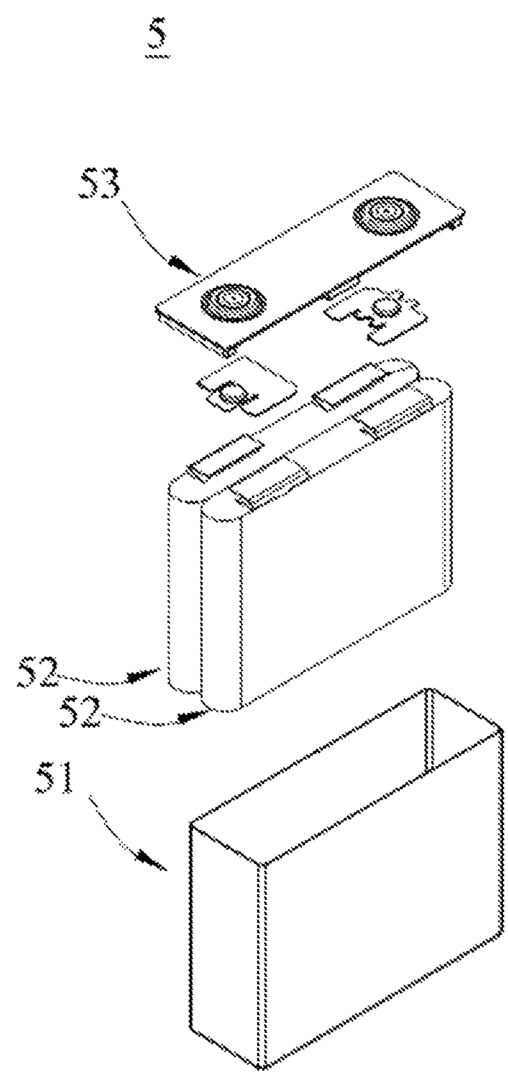
FIG. 4 is an exploded view of FIG. 3.

In a particular embodiment of the present application, the electrochemical device is a lithium ion battery. FIG. 3 is a perspective view of a lithium ion battery 5 according to an embodiment of the present application. FIG. 4 is an exploded view of FIG. 3. Referring to FIG. 3 and FIG. 4, the lithium ion battery 5 includes a case 51, an electrode assembly 52, a top cover assembly 53, and an electrolyte (not shown).

The electrode assembly 52 is packed in the case 51. The number of electrode assembly 52 is not limited and may be one or more. The electrode assembly 52 includes a positive electrode plate, a negative electrode plate, and a separator. The separator separates the positive electrode plate from the negative electrode plate. The electrolyte is injected into the case 51 and has soaked through the electrode assembly 52, the electrode assembly comprising, for example, a first electrode plate, a second electrode plate and a separator.

Please be noted that the lithium ion battery 5 shown in FIG. 3 is a can-type battery, but is not limited thereto, and the lithium ion battery 5 may be a pouch-type battery in which the case 51 is replaced by a metal plastic film and the top cover assembly 53 is removed.

Next, a battery module according to another aspect of the present application will be described.

Figure 5:
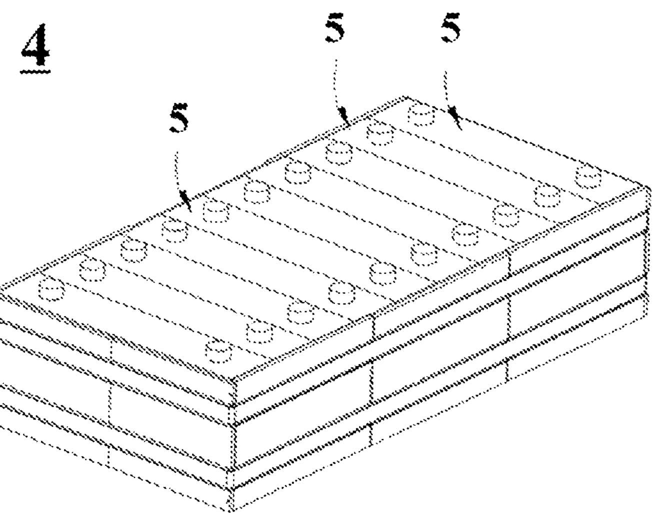
FIG. 5 is a perspective view of a battery module according to an embodiment of the present application.

FIG. 5 is a perspective view of a battery module 4 according to an embodiment of the present application.

The battery module 4 according to an embodiment of the present application comprises the lithium-ion battery 5 according to the present application.

Referring to FIG. 5, the battery module 4 includes a plurality of batteries 5. A plurality of lithium ion batteries 5 are arranged in the longitudinal direction. The battery module 4 can function as a power source or an energy storage device. The number of lithium ion battery 5 contained the battery module 4 can be adjusted according to the application and capacity of the battery module 4.

Next, a battery pack according to a still another aspect of the present application will be described.

Figure 6:
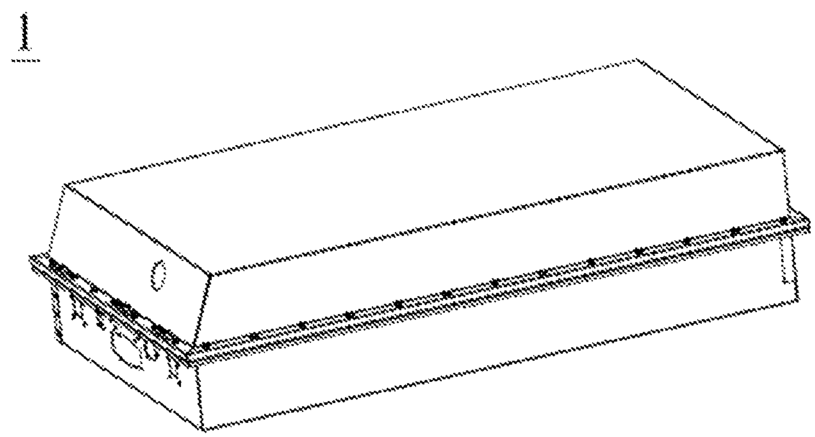
FIG. 6 is a perspective view of a battery pack according to an embodiment of the present application.
Figure 7:
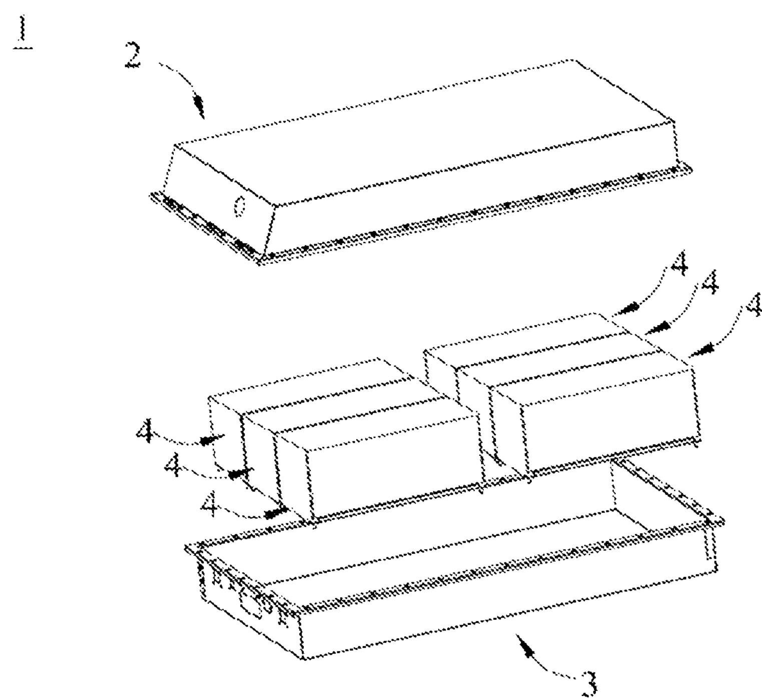
FIG. 7 is an exploded view of FIG. 6.

FIG. 6 is a perspective view of a battery pack 1 according to an embodiment of the present application. FIG. 7 is an exploded view of FIG. 6.

The battery pack 1 according to the present application comprises the battery module 4 according to an embodiment of the present application.

Specifically, referring to FIG. 6 and FIG. 7, the battery pack 1 includes an upper cabinet body 2, a lower cabinet body 3, and a battery module 4. The upper cabinet body 2 and the lower cabinet body 3 are assembled together to form a space in which the battery module 4 is packed. The battery module 4 is placed in the space formed by assembling the upper cabinet body 2 and the lower cabinet body 3 together. The battery module 4 comprises an output passing through one or both of the upper cabinet body 2 and the lower cabinet body 3 to supply power to the outside or to be charged from the outside. The number and arrangement of the battery modules 4 contained in the battery pack 1 can be determined according to actual needs.

Next, a device according to still another aspect of the present application will be described.

Figure 8:
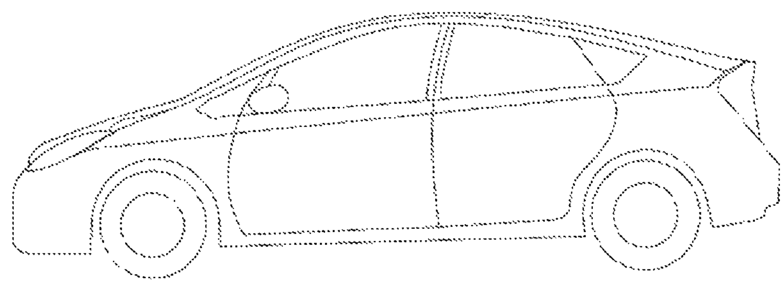
FIG. 8 is a schematic view showing a device with a lithium ion battery as a power source according to an embodiment of the present application.

FIG. 8 is a schematic view showing a device with a lithium ion battery as a power source according to an embodiment of the present application.

The device according to the present application comprises the lithium ion battery 5 according to an embodiment of the present application, and the lithium ion battery 5 can be used as a power source of the device. In FIG. 8, the device with the lithium ion battery 5 is an electric car. Apparently, without limited thereto the device with the lithium ion battery 5 may be any other electric vehicles such as, an electric bus, an electric tram, an electric bicycle, an electric motorcycle, an electric scooter, an electric golf cart, an electric truck, electric ships, electric tools, electronic equipment and energy storage systems. The electric vehicle can be a pure electric vehicle, a hybrid electric vehicle, or a plug-in hybrid electric vehicle. Apparently, according to the actual form of use, the device according to the present application may comprises the battery module 4 as described in the present application. Apparently, the device according to the present application may also comprises the battery pack 1 as described in the present application.

Those skilled in the art can understand that the various limitations or preferred ranges of component selection, component content, and physical and chemical performance parameters of the safety coating in different embodiments of the present application mentioned above can be arbitrarily combined, and various embodiments obtained by above combination are still within the scope of this application and are considered a part of the disclosure of this specification.

Examples

In order to make the objects, the technical solutions and the beneficial technical effects of the present application more clear, the present application will be described in further detail below with reference to the embodiments. However, it is to be understood that embodiments of the present application are only intended to be illustrative of the present application, and are not intended to limit the invention, and embodiments of the present application are not limited to those embodiments given in the specification. The experimental conditions not indicated in the examples refer to conventional conditions, or the conditions recommended by the material supplier or equipment supplier.

1. Preparation Method 1.1 Preparation of Positive Electrode Plate

1) Safety Coating

Depending on whether or not the polymer matrix material in the safety coating is subjected to crosslinking treatment, the safety coating was prepared by one of the following two methods.

For the polymer matrix without cross-linking treatment:

A certain ratio of a polymer matrix material, a conductive material, and an optional inorganic filler were mixed with N-methyl-2-pyrrolidone (NMP) as a solvent with stirring uniformly. The resulting mixture was then coated on both sides of metal current collector, followed by drying at 85° C. to obtain a PTC layer, i.e. a safety coating.

For the polymer matrix with cross-linking treatment:

A polymer matrix material, a conductive material, and an optional inorganic filler were mixed in a certain ratio with N-methyl-2-pyrrolidone (NMP) as a solvent with stirring uniformly and then an activator and a crosslinking agent were added with stirring uniformly. The resulting mixture was then coated on both sides of metal current collector, followed by drying at 85° C. to obtain a safety coating.

2) Positive Active Material Layer

Then, 90 wt % of a positive active material, 5 wt % of SP, and 5 wt % of PVDF were mixed with NMP as a solvent with stirring uniformly, which was then coated on the safety coating of the current collector as prepared according to the above method followed by drying at 85° C. to obtain a positive active material layer.

3) Work Up

Then, the current collector with the safety coating and the positive active material layer was cold-pressed, then trimmed, cut, and stripped, followed by drying under vacuum at 85° C. for 4 hours. After welding electrode tab, the positive electrode plate meeting the requirements of the secondary battery was obtained.

The main materials used in the specific examples of the safety coating were as follows:

Polymer matrix: PVDF (Manufacturer "Solvay", model 5130), PVDC;

Activator: sodium silicate and potassium silicate;

Crosslinking agent; acrylonitrile;

Conductive material (conductive agent): Super-P (TIMCAL, Switzerland, abbreviated as SP);

Inorganic filler: alumina, lithium iron phosphate (abbreviated as LFP), carbon coating modified lithium iron phosphate (abbreviated as LFP/C), and carbon coating modified lithium titanate (abbreviated as $Li_4Ti_5O_{12}$/C);

Positive active material: NCM811 ($LiNi_{0.8}Co_{0.1}Mn_{0.1}O_2$); and

Current collector: aluminum foil in a thickness of 12 μm.

The above materials were commonly used materials in the lithium battery industry which may be commercially available from the corresponding suppliers.

1.2 Preparation of Negative Electrode Plate

Negative electrode plate was prepared as follows: active material graphite, conductive agent Super-P, thickener CMC, binder SBR were added to deionized water as a solvent at a mass ratio of 96.5:1.0:1.0:1.5 to form an anode slurry; then the slurry was coated on the surface of the negative metal electrode current collector in the form of copper foil, and dried at 85° C., then trimmed, cut, and stripped, followed by drying under vacuum at 110° C. for 4 hours. After welding electrode tab, the negative electrode plate meeting the requirements of the secondary battery was obtained.

1.3 Preparation of Electrolyte

Ethylene carbonate (EC), ethyl methyl carbonate (EMC), and diethyl carbonate (DEC) were mixed at a volume ratio of 3:5:2 to obtain a mixed solvent of EC/EMC/DEC, followed by dissolving the fully dried lithium salt $LiPF_6$ into the mixed solvent at a concentration of 1 mol/L to prepare an electrolyte.

1.4 Preparation of the Battery

A polypropylene film with a thickness of 12 μm was used as a separator, and the positive electrode plate, the separator and the negative electrode plate were stacked in order, so that the separator was sandwiched in between the positive electrode plate and the negative electrode plate, and then the stack was wound into a bare battery core. After vacuum baking at 75° C. for 10 h, the electrolyte (prepared as described in "Preparation of electrolyte" above) was injected therein followed by vacuum package and standing for 24 h, to obtain a battery cell. After that, the battery cell was charged to 4.2 V with a constant current of 0.1 C, and then was charged with a constant voltage of 4.2 V until the current dropped to 0.05 C, and then was discharged to 3.0V with a constant current of 0.1 C. Above charging and discharging processes were repeated twice. Finally, the battery cell was charged to 3.8V with a constant current of 0.1 C, thereby completing the preparation of the secondary battery.

2. Tests for Material Performance

In each of the examples and comparative examples, the physical property parameters of the materials were measured by the common method in the art, unless otherwise specified.

Some specific parameters were tested using the following methods.

2.1 $Na^+$/$K^+$ Content:

Standard solutions of Na ions or K ions were prepared, and used to make a calibration curve by using a plasma emission spectrometer. A positive electrode plate was taken. Film layer was scraped from current collector of the positive electrode plate with a blade, cut into pieces with scissors, followed by weighting and adding into 10 mL of 1:1 aqua regia for microwave dissolution. After dissolution, the solution was made up to a definite volume in a volumetric flask, and then subjected to an ICP test. The concentration of Na or K ions was calculated.

2.2 Infrared Spectrum:

A positive electrode plate was taken. Film layer was scraped from current collector of the positive electrode plate with a blade to form powders. Then the obtained powders were tested for its transmission infrared spectrum. The infrared test was performed with reference to GB/T 21186-2007 "Chinese National Standard for Fourier Transform Infrared Spectrometer".

2.3 Particle Size

The power sample was dispersed in a dispersing medium (distilled water), which was measured with a Malvern laser particle size analyzer MS2000 for 5 times and averaged in μm.

2.4 BET (Specific Surface Area)

The specific surface area of the powder sample of the test material was measured with a Quadrasorb SI specific surface tester for 5 times and averaged in unit of $m^2/g$.

2.5 Binding Force Between Film Layer and Current Collector

The electrode plate containing a film layer on both sides of the current collector was cut into a sample to be tested having a width of 2 cm and a length of 15 cm. One side of the sample to be tested was uniformly adhered to a stainless steel plate at 25° C. under normal pressure by using 3M double-sided tape. One end of the sample to be tested was fixed on a GOTECH tensile machine, and the film layer of the sample to be tested was stripped from the current collector by using the GOTECH tensile machine, wherein the maximum tensile force was read according to the data diagram of the tensile force and the displacement. The resulting value (in unit N) was divided by the width of the sample i.e. 0.02 to calculate the binding force (N/m).

2.6 Elongation at Break of Current Collector

Two samples having a length of 200 mm and a width of 15 mm were taken from the current collector. The thickness h was measured by micrometer in μm. The sample was then mounted on a tensile machine (model AI7000) and stretched at 50 mm/min. Two test results were averaged. Record the initial length L0, and start the tensile machine, until the sample broke, and read the displacement L1 of the sample at break from the tensile machine. Elongation at break=(L1−L0)/L0*100%.

2.7 Thickness of Current Collector, Thickness of Coating and Thickness of Film Layer Thickness of the current collector was measured by a micrometer at 5 points and averaged.

Thickness of the coating and thickness of film layer: first measure the thickness of the current collector, and then measure the total thickness of the current collector with the coating. The difference between the two values was used as the thickness of the coating. The thickness of film layer was obtained with above similar method.

2.8 Cracking of Coating

After drying and obtaining a positive active material layer, if no cracks were observed in the 100 $m^2$ electrode plate, it was defined as no cracking; if the number of occurrences of cracks in 100 $m^2$ electrode plate was ≤3, it was defined as mild cracking; if the number of occurrences of cracks in 100 $m^2$ electrode plate was >3, it was defined as severe cracking.

2.9 Elongation of Film Layer

Removal of the current collector from the electrode plate: take the positive electrode plate out of the battery core and add the electrolyte, so that the electrode plate was completely immersed in the electrolyte, which was stored at 90° C. for more than 48 h, and then taken out. After that, the film layer of the positive electrode plate can be peeled off from the current collector.

The resulting film layer was used to prepare a sample having a width of 20 mm and a length of 50 mm, which thickness h (μm) was measured with a micrometer. The sample was then mounted on a tensile machine (model AI7000) and the initial length L0 was recorded. Start the tensile test and stretch the sample at 50 mm/min until the sample breaks. The displacement L1 of the sample at break was read from the tensile machine. The elongation=(L1−L0)/L0*100%.

3. Test for Battery Performance

The safety performance of the secondary batteries from various examples and comparative examples were evaluated using GBT31485-2015 "Safety Requirements and Test Methods for Traction Battery of Electric Vehicle", and the test results were recorded.

3.1 Puncture Test:

The secondary battery was fully charged to the charging cut-off voltage with a current of 1 C, and then charged with a constant voltage until the current dropped to 0.05 C. After that, charging was terminated. A high temperature resistant steel needle of φ5-10 mm (the tip thereof had a cone angle of 45°) was used to puncture the battery plate at a speed of 25 mm/sin the direction perpendicular to the battery plate. The puncture position should be close to the geometric center of the surface to be punctured, the steel needle stayed in the battery, and then observation was made to see if the battery had an indication of burning or exploding.

3.2 Overcharge Test:

The secondary battery was fully charged to the charging cut-off voltage with a current of 1 C, and then charged with a constant voltage until the current dropped to 0.05 C. After that, charging was terminated. Then, after charging with a constant current of 1 C to reach a voltage of 1.5 times the charging cut-off voltage or after charging with a constant current of 1 C for 1 hour, the charging was terminated.

3.3 Cycle Performance Test:

The test conditions for the cycle performance test were as follows: the secondary battery was subjected to a 1 C/1 C cycle test at 25° C., in which the charging and discharging voltage range was 2.8 to 4.2 V. The test was terminated when the capacity was attenuated to 80% of the first discharging specific capacity.

3.4 PTC Effect Test

The secondary battery was fully charged to the charging cut-off voltage with a current of 1 C, and then charged with a constant voltage until the current was reduced to 0.05 C. After that, the charging was terminated and the DC resistance of the battery cell was tested (discharging with a current of 4 C for 10 s). Then, the battery cell was placed at 130° C. for 1 h followed by testing the DC resistance, and calculating the DC resistance growth rate. Then, the battery cell was placed at 130° C. for 2 h followed by testing the DC resistance, and calculating the DC resistance growth rate.

3.5 DCR Test

The secondary battery was adjusted to 50% SOC with a current of 1 C at 25° C., and the voltage U1 was recorded. Then, it was discharged with a current of 4 C for 30 seconds, and the voltage U2 was recorded. DCR=(U1−U2)/4 C.

In the present application, for convenience of comparison, the DCR of the battery core in which the polymer material using uncrosslinked PVDF matrix was used as a control, and was recorded as 100%, and the DCR of the other battery cores and the ratio thereof were calculated and recorded.

4. Performance Test Results 4.1 Protection Performance (PTC Effect) of Safety Coating and Effect Thereof on Battery Performance In order to confirm the protection performance of the present application, the corresponding safety coating, positive electrode plate, negative electrode plate and battery were prepared with the specific materials and amounts listed in Table 1-1 below according to the methods and procedures described in "1. Preparation method", and were tested according to the method specified in "3. Tests for battery performance". In order to ensure accuracy of data, 4 samples were prepared for each battery (10 samples for the puncture test) and tested independently. The test results were finally averaged and shown in Table 1-2 and Table 1-3.

In the test, the conventional electrode plate CPlateP was prepared with the method described in "1.1 Preparation of positive electrode plate", but no safety coating was provided. That is to say, a positive active material was directly applied over the current collector. The conventional electrode plate CPlate N was prepared according to the method described in "1.2 Preparation of negative electrode plate".

TABLE 1-1

| Compositions of electrode plate | | | | | | | | | |
|---|---|---|---|---|---|---|---|---|---|
| | | | Composition of the safety coating | | | | | | |
| | | positive active | polymer matrix | | conductive material | | Inorganic filler | | Thickness of safety coating H |
| | Electrode | material | material | wt % | material | wt % | material | wt % | (μm) |
| CPlate P | Positive | NCM811 | / | / | / | / | / | / | / |
| CPlate N | Negative | graphite | / | | | | | | / |
| Comp. Plate CP | Positive | NCM811 | Uncrosslinked PVDF | 90 | SP | 10 | / | / | 20 |
| Plate 1 | Positive | NCM811 | Uncrosslinked PVDC | 35 | SP | 10 | alumina | 55 | 10 |
| Plate 2 | Positive | NCM811 | Uncrosslinked PVDF | 35 | SP | 10 | LFP | 55 | 3 |

TABLE 1-2

| Performance of lithium-ion batteries | | | |
|---|---|---|---|
| Battery No. | Positive electrode plate | Negative electrode plate | Puncture Test |
| Battery 1 | CPlate P | CPlate N | 0 pass, 10 not pass |
| Battery 2 | Comp. Plate CP | CPlate N | 2 pass, 8 not pass |
| Battery 3 | Plate 1 | CPlate N | 10 pass |
| Battery 4 | Plate 2 | CPlate N | 10 pass |

TABLE 1-3

| Performance of lithium-ion batteries | | | | |
|---|---|---|---|---|
| Battery No. | Positive electrode plate | Negative electrode plate | Growth rate of DCR (130° C., 1 h) | Growth rate of DCR (130° C., 2 h) |
| Battery 2 | Comp. Plate CP | CPlate N | 20% | 30% |
| Battery 4 | Plate 2 | CPlate N | 1200% | 1500% |

The data in Table 1-1, table 1-2 and Table 1-3 indicated that the safety coating with PVDF or PVDC as a polymer matrix significantly improved the safety performance of the battery during nail penetration, especially in the case that an inorganic filler was added. The growth rate of DCR data in Table 1-3 indicated that the safety coating composed of PVDF and a conductive material did have a PTC effect, and the addition of the inorganic filler significantly improved the DCR growth rate of the battery at a high temperature, that is, the PTC effect was more remarkable.

4.2 Effect of the Content of Each Component Contained in the Safety Coating

In order to further study the effect of the content of each component contained in the safety coatings, the corresponding safety coatings, positive electrode plates, negative electrode plates and batteries were prepared with the specific materials and amounts listed in Table 2-1 below according to the methods and procedures described in "1. Preparation method", and then were tested according to the method specified in "3. Test for battery performance". In order to ensure the accuracy of data, 4 samples were prepared for each battery (10 samples for the puncture test) and tested independently. The test results were finally averaged and shown in Table 2-2.

TABLE 2-1

| Compositions of electrode plates | | | | | | | | | |
|---|---|---|---|---|---|---|---|---|---|
| | | | Composition of the safety coating | | | | | | |
| | | positive active | polymer matrix | | conductive material | | Inorganic filler | | Thickness H of safety coating |
| | Electrode | material | material | wt % | material | wt % | material | wt % | (μm) |
| Comp. Plate 2-1 | Positive | NCM811 | Uncrosslinked PVDF | 75 | SP | 20 | alumina | 5 | 8 |
| Plate 2-2 | Positive | NCM811 | Uncrosslinked PVDF | 75 | SP | 15 | alumina | 10 | 8 |
| Plate 2-3 | Positive | NCM811 | Uncrosslinked PVDF | 75 | SP | 10 | alumina | 15 | 8 |
| Plate 2-4 | Positive | NCM811 | Uncrosslinked PVDF | 60 | SP | 10 | alumina | 30 | 8 |
| Plate 2-5 | Positive | NCM811 | Uncrosslinked PVDF | 60 | SP | 8 | alumina | 32 | 8 |
| Plate 2-6 | Positive | NCM811 | Uncrosslinked PVDF | 55 | SP | 15 | alumina | 30 | 8 |

TABLE 2-1-continued

| Compositions of electrode plates | | | | | | | | | |
|---|---|---|---|---|---|---|---|---|---|
| | | | Composition of the safety coating | | | | | | |
| | | positive active | polymer matrix | | conductive material | | Inorganic filler | | Thickness H of safety coating |
| | Electrode | material | material | wt % | material | wt % | material | wt % | (μm) |
| Plate 2-7 | Positive | NCM811 | Uncrosslinked PVDF | 50 | SP | 25 | alumina | 25 | 8 |
| Plate 2-8 | Positive | NCM811 | Uncrosslinked PVDF | 40 | SP | 15 | alumina | 45 | 8 |
| Plate 2-9 | Positive | NCM811 | Uncrosslinked PVDF | 35 | SP | 5 | alumina | 60 | 8 |
| Comp. Plate 2-10 | Positive | NCM811 | Uncrosslinked PVDF | 25 | SP | 5 | alumina | 70 | 8 |

TABLE 2-2

| Performance of lithium-ion batteries | | | | |
|---|---|---|---|---|
| Battery | Positive electrode | Negative electrode | Puncture Test | Cycle Life (cycle) |
| Battery 6 | Comp. Plate 2-1 | CPlate N | 5 pass, 5 not pass | 2502 |
| Battery 7 | Plate 2-2 | CPlate N | 10 pass | 2351 |
| Battery 8 | Plate 2-3 | CPlate N | 10 pass | 2205 |
| Battery 9 | Plate 2-4 | CPlate N | 10 pass | 2251 |
| Battery 10 | Plate 2-5 | CPlate N | 10 pass | 2000 |
| Battery 11 | Plate 2-6 | CPlate N | 10 pass | 2408 |
| Battery 12 | Plate 2-7 | CPlate N | 10 pass | 2707 |
| Battery 13 | Plate 2-8 | CPlate N | 10 pass | 2355 |
| Battery 14 | Plate 2-9 | CPlate N | 10 pass | 1800 |
| Battery 15 | Comp. Plate 2-10 | CPlate N | 4 pass, 6 not pass | 1715 |

The data in Table 2-1 and Table 2-2 show that: (1) If the content of the inorganic filler is too low, then the stability of the safety coating is not high enough, so safety performance of the battery cannot be fully improved; if the content of the inorganic filler is too high, then the content of the polymer matrix is too low, so that the effect of the safety coating cannot be secured; (2) the conductive material has a great influence on the internal resistance and polarization of the battery, so it would affect the cycle life of the battery. The higher the content of the conductive material, the smaller the internal resistance and polarization of the battery, so that the cycle life will be better.

It had been found through experiments that the appropriate content range of each component in the safety coating is as follows:

the weight percentage of the polymer matrix is 35 wt % to 75 wt %;

the weight percentage of the conductive material is 5 wt % to 25 wt %; and the weight percentage of the inorganic filler is from 10 wt % to 60 wt %.

As long as the content of each component in the safety coating is within the above range, the effect of improving the safety and electrical performance (e.g., cycle performance) of the battery can be achieved.

4.3 Effect of the Kind of the Inorganic Filler on Battery Performance

In order to further study the effect of materials in the safety coating on performance of the electrode plate and the battery, the corresponding safety coatings, positive electrode plates, negative electrode plates and batteries were prepared with the specific materials and amounts listed in Table 3-1 below according to the methods and procedures described in "1. Preparation method", and were tested according to the method specified in "3. Test for battery performance". In order to ensure accuracy of data, 4 samples were prepared for each battery (10 samples for the puncture test) and tested independently. The test results were finally averaged which were shown in Table 3-2.

TABLE 3-1

| Compositions of electrode plate | | | | | | | | | | |
|---|---|---|---|---|---|---|---|---|---|---|
| | | | Composition of the safety coating | | | | | | | |
| | | Positive active | polymer matrix | | conductive material | | Inorganic filler | | | Thickness of safety coating H |
| | Electrode | material | material | wt % | material | wt % | material | wt % | Carbon Content | (μm) |
| Plate 2-41 | Positive | NCM811 | Uncrosslinked PVDF | 60 | SP | 10 | alumina | 30 | / | 8 |
| Plate 2-42 | Positive | NCM811 | Uncrosslinked PVDF | 60 | SP | 10 | LFP | 30 | / | 8 |
| Plate 2-43 | Positive | NCM811 | Uncrosslinked PVDF | 60 | SP | 10 | LFP/C | 30 | 1 | 8 |

TABLE 3-1-continued

| Compositions of electrode plate | | | | | | | | | | |
|---|---|---|---|---|---|---|---|---|---|---|
| | | | Composition of the safety coating | | | | | | | |
| | | Positive active | polymer matrix | | conductive material | | Inorganic filler | | | Thickness of safety coating H |
| | Electrode | material | material | wt % | material | wt % | material | wt % | Carbon Content | (μm) |
| Plate 2-44 | Positive | NCM811 | Uncrosslinked PVDF | 60 | SP | 10 | LFP/C | 30 | 2 | 8 |
| Plate 2-45 | Positive | NCM811 | Uncrosslinked PVDF | 60 | SP | 10 | LFP/C | 30 | 3 | 8 |
| Plate 2-46 | Positive | NCM811 | Uncrosslinked PVDF | 60 | SP | 10 | $Li_4Ti_5O_{12}/C$ | 30 | 5 | 8 |

TABLE 3-2

| Performance of lithium-ion batteries | | | | | |
|---|---|---|---|---|---|
| Battery | Positive electrode | Negative electrode | Puncture Test | Overcharge Test | Cycle test (cycle) |
| Battery 46 | Plate 2-41 | CPlate N | 10 pass | 0 pass, 10 not pass | 2200 |
| Battery 47 | Plate 2-42 | CPlate N | 10 pass | 10 pass | 2300 |
| Battery 48 | Plate 2-43 | CPlate N | 10 pass | 10 pass | 2500 |
| Battery 49 | Plate 2-44 | CPlate N | 10 pass | 10 pass | 2700 |
| Battery 50 | Plate 2-45 | CPlate N | 10 pass | 10 pass | 2900 |
| Battery 51 | Plate 2-46 | CPlate N | 10 pass | 10 pass | 3000 |

The data in Tables 3-1 and 3-2 showed that compared to other materials (such as alumina), the electrochemically active material significantly improved the overcharge safety performance of the battery. In addition, carbon coating modified electrochemically active material also improved the cycle life of the battery.

4.4 Effect of Crosslinking on Performance of Plate and Battery

The corresponding safety coating, positive electrode plates, negative electrode plates and batteries were prepared with the specific materials and amounts listed in Table 4-1 below according to the methods and procedures described above, and were tested according to the specified method to study the effect of the crosslinking on coating cracking, DCR and the like, the results were shown in Table 4-2.

The data in Tables 4-1 and 4-2 show that in the case where the coating speed of the positive active material layer was 50 m/min, the polymer matrix of the electrode plate 2-61 was not cross-linked (in which the film layer does not contain ≥100 ppm Na ions or K ions and does not have an absorption peak at 1646 $cm^{-1}$ in its infrared absorption spectrum), and thus there was a severe cracking on the electrode plate. The introduction of a cross-linked structure had a significant effect on improving the cracking of the electrode plate. No cracking occurred in the electrode plate 2-62 to the electrode plate 2-64 having cross-linked structure (the film layer in each plate containing ≥100 ppm Na ions or K ions and having an absorption peak at 1646 $cm^{-1}$ in its infrared absorption spectrum). Similar experiments were performed for PVDC and the results were similar, which was not shown. It can be seen that the introduction of the cross-linked structure significantly eliminated the coating cracking of the electrode plate. The reasons are as follows. The introduction of a cross-linked structure greatly reduces the dissolution of the polymer material in the safety coating into organic solvents contained in the upper active material slurry, thereby reducing cracking and greatly improving production efficiency. Moreover, after the introduction of cross-linked structure, all samples passed puncture test, indicating that the introduction of cross-linked structure does not adversely affect the protective effect of the safety coating.

In addition, for the electrode plate 2-61 in which the polymer matrix was not crosslinked, the polymer matrix was swelled greatly in the electrolyte, resulting in a relatively large DCR. From the results of plates 2-62, 2-63 and 2-64, it can be seen that the introduction of cross-linked structure reduced the swelling of the polymer matrix in the electrolyte, and significantly reduced DCR. From above results, it was confirmed that the addition of the crosslinking agent significantly reduced the DCR of the battery.

In summary, PVDF/PVDC can be used as the polymer matrix of PTC layer regardless of crosslinking or not, and the obtained battery had high safety performance in which the test result of puncture test is excellent. Furthermore, compared with the uncrosslinked PVDC/PVDF, the introduction of a cross-linked structure improved the cracking of the electrode plate, from severe cracking to no cracking or mild cracking, thereby further improving performance of battery.

It will be understood by those skilled in the art that the above application examples of the electrode plate of the present application are only exemplified to be used for a lithium battery, but the electrode plate of the present application can also be applied to other types of batteries or electrochemical devices, and still may produce good technical effect of the present application.

It will be apparent to those skilled in the art that the present application may be modified and varied in accordance with the above teachings. Accordingly, the present application is not limited to the specific embodiments disclosed and described above, and modifications and variations of the present application are intended to be included within the scope of the claims of the present application. In addition, although some specific terminology is used in this specification, these terms are for convenience of illustration only and are not intended to limit the present application in any way.

TABLE 4-1

| Composition of electrode plate | | | | | | | | | | | |
|---|---|---|---|---|---|---|---|---|---|---|---|
| | | | Coating Composition | | | | | | | | |
| | | Positive active material | Polymer matrix | | Conductive material | | Inorganic filler | | | | |
| | Electrode | | Material | wt % | Material | wt % | Material | wt % | Carbon content/w % | Thickness H/μm | |
| Plate 2-61 | Positive | NCM811 | Uncrosslinked PVDF | 60 | SP | 10 | LFP/C | 30 | / | 8 | |
| Plate 2-62 | Positive | NCM811 | Crosslinked PVDF | 60 | SP | 10 | LFP/C | 30 | / | 8 | |
| Plate 2-63 | Positive | NCM811 | Crosslinked PVDF | 60 | SP | 10 | LFP/C | 30 | 1 | 8 | |
| Plate 2-64 | Positive | NCM811 | Crosslinked PVDF | 60 | SP | 10 | LFP/C | 30 | 2 | 8 | |

| | Activator and its content | | | Crosslinking agent and its content | | |
|---|---|---|---|---|---|---|
| | Material | Weight ratio of the activator to the polymer matrix | $Na^+$ or $K^+$ content/ppm | Material | Weight ratio of the activator to the polymer matrix | Absorption peak at 1646 $cm^{-1}$ |
| Plate 2-61 | / | / | / | / | / | no |
| Plate 2-62 | Na silicate | 1 wt % | 210 | acrylo-nitrile | 1.5% | yes |
| Plate 2-63 | Na silicate | 2 wt % | 430 | acrylo-nitrile | 1.5% | yes |
| Plate 2-64 | K silicate | 0.5 wt % | 120 | acrylo-nitrile | 1.5% | yes |

TABLE 4-2

| Performance of lithium-ion batteries | | | | | |
|---|---|---|---|---|---|
| Battery | Positive electrode | Negative electrode | Puncture Test | Cracking at coating speed of 50 m/min | DCR |
| Battery 61 | Plate 2-61 | CPlate N | 10 pass | Severe cracking | 100% |
| Battery 62 | Plate 2-62 | CPlate N | 10 pass | No cracking | 88% |
| Battery 63 | Plate 2-63 | CPlate N | 10 pass | No cracking | 80% |
| Battery 64 | Plate 2-64 | CPlate N | 10 pass | No cracking | 93% |

The invention claimed is:

1. A positive electrode plate comprising a current collector, a positive active material layer and a safety coating disposed between the current collector and the positive active material layer, the safety coating comprising a polymer matrix and a conductive material, wherein the polymer matrix is fluorinated polyolefin and/or chlorinated polyolefin, and when the safety coating and the positive active material layer are collectively referred to as a positive film layer, the positive film layer comprises Na ions and/or K ions at a content of 100 ppm or more, and has an absorption peak at 1646 $cm^{-1}$ in infrared absorption spectrum.

2. The positive electrode plate as claimed in claim 1, wherein the safety coating further comprises an inorganic filler, and based on the total weight of the polymer matrix, the conductive material and the inorganic filler being 100%, weight percentage of the polymer matrix is from 35 wt % to 75 wt %;

weight percentage of the conductive material is from 5 wt % to 25 wt %; and weight percentage of the inorganic filler is from 10 wt % to 60 wt %.

3. The positive electrode plate as claimed in claim 1, wherein the polymer matrix is selected from at least one of polyvinylidene fluoride (PVDF), carboxylic acid modified PVDF, acrylic acid modified PVDF, polyvinylidene chloride (PVDC), carboxylic acid modified PVDC, acrylic acid modified PVDC, PVDF copolymers, and PVDC copolymers.

4. The positive electrode plate as claimed in claim 1, wherein the conductive material is selected from at least one of a conductive carbon-based material, a conductive metal material, and a conductive polymer material, preferably, the conductive carbon-based material is selected from at least one of conductive carbon black, acetylene black, graphite, graphene, carbon nanotubes, and carbon nanofibers;

preferably, the conductive metal material is selected from at least one of Al powder, Ni powder, and gold powder; and preferably, the conductive polymer material is selected from at least one of conductive polythiophene, conductive polypyrrole, and conductive polyaniline.

5. The positive electrode plate as claimed in claim 2, wherein the inorganic filler is selected from at least one of metal oxides, non-metal oxides, metal carbides, non-metal carbides, and inorganic salts, all optionally modified with at least one of a conductive carbon coating, a conductive metal coating and a conductive polymer coating:

preferably, the inorganic filler of the safety coating is at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, and lithium titanate, all optionally modified with a conductive carbon coating, a conductive metal coating, or a conductive polymer coating;

preferably the inorganic filler has an average particle diameter D of 100 nm≤D≤10 μm, and preferably the inorganic filler has a specific surface area (BET) of not more than 500 $m^2/g$.

6. The positive electrode plate as claimed in claim 2, wherein based on the total weight of the polymer matrix, the conductive material and the inorganic filler being 100%, the weight percentage of the polymer matrix is from 50 wt % to 75 wt %;

the weight percentage of the conductive material is from 5 wt % to 20 wt %; and the weight percentage of the inorganic filler is from 15 wt % to 45 wt %.

7. The positive electrode plate as claimed in claim 1, wherein the weight ratio of the polymer matrix to the conductive material is 2 or more and 8 or less.

8. The positive electrode plate as claimed in claim 1, wherein the safety coating has a thickness H of 1 μm≤H≤20 μm.

9. The positive electrode plate as claimed in claim 1, wherein the positive film layer has an elongation of 30% or more, preferably of 80% or more, more preferably of 80% or more and 300% or less.

10. An electrochemical device comprising the positive electrode plate as claimed in claim 1, which is a capacitor, a primary battery or a secondary battery.

11. A battery module comprising the battery as described in claim 10.

12. A battery pack comprising the battery module according to claim 11.

13. A device comprising the battery as described in claim 10, wherein the battery is used as a power source of the device; preferably, the device comprises an electric vehicle, a hybrid electric vehicle, a plug-in hybrid electric vehicle, an electric bicycle, an electric scooter, an electric golf cart, an electric truck, an electric ship, or an energy storage system.

14. The positive electrode plate as claimed in claim 4, wherein the conductive carbon-based material is selected from at least one of conductive carbon black, acetylene black, graphite, graphene, carbon nanotubes, and carbon nanofibers.

15. The positive electrode plate as claimed in claim 4, wherein the conductive metal material is selected from at least one of Al powder, Ni powder, and gold powder.

16. The positive electrode plate as claimed in claim 4, wherein the conductive polymer material is selected from at least one of conductive polythiophene, conductive polypyrrole, and conductive polyaniline.

17. The positive electrode plate as claimed in claim 5, wherein the inorganic filler of the safety coating is at least one of magnesium oxide, aluminum oxide, titanium dioxide, zirconium oxide, silicon dioxide, silicon carbide, boron carbide, calcium carbonate, aluminum silicate, calcium silicate, potassium titanate, barium sulfate, lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium manganese iron phosphate, lithium iron silicate, lithium vanadium silicate, lithium cobalt silicate, lithium manganese silicate, spinel lithium manganese oxide, spinel lithium nickel manganese oxide, and lithium titanate, all optionally modified with a conductive carbon coating, a conductive metal coating, or a conductive polymer coating.

18. The positive electrode plate as claimed in claim 5, wherein the inorganic filler has an average particle diameter D of 100 nm≤D≤10 μm.

19. The positive electrode plate as claimed in claim 5, wherein the inorganic filler has a specific surface area (BET) of not more than 500 $m^2/g$.

20. The positive electrode plate as claimed in claim 9, wherein the positive film layer has an elongation of 80% or more and 300% or less.

* * * * *